UNITED STATES PATENT OFFICE.

KASPAR WINKLER, OF ZURICH, SWITZERLAND.

PROCESS FOR PRODUCING TRANSPARENT, FLEXIBLE, AND INFUSIBLE INSULATING MEANS.

950,979.  Specification of Letters Patent.  Patented Mar. 1, 1910.

No Drawing.   Application filed November 16, 1903.  Serial No. 462,977.

*To all whom it may concern:*

Be it known that I, KASPAR WINKLER, a subject of Austria-Hungary, residing at Zurich, in the Canton of Zurich, Republic of Switzerland, (whose post-office address is 1 Malzstrasse, Zurich III,) have invented certain new and useful Improvements in Processes for Producing Transparent, Flexible, and Infusible Insulating Means; and I do hereby declare the following to be a full, clear, and exact description of the invention, such as will enable others skilled in the art to which it appertains to make and use the same.

Hitherto drying vegetable oils have been used to produce a protecting film upon metallic articles by a continued heating. In these processes, a thickening of the oil takes place after some time in consequence of the oxidizing action of the air, either at ordinary temperatures or upon an artificially increased heating, and this thickening may increase until the oil becomes a solid.

The particular object of the present process is to transform also the scarcely oxidizable animal fats, especially fat train-oils and liquid waxes, and to coat incombustible materials, *e. g.*, asbestos, with such fats mixed with other agents. This is preferably done by suddenly raising their temperature in an air bath; or by means of a direct oxidizing flame, in such manner, that a transparent, elastic non-adhesive, insulating, film of high heat durability is produced.

In order to favor the taking up of oxygen and, thereby, the process of stiffening in these fats, the products of distillation of colophony in quantities of 30 to 90 per cent. are added to the said fats. Finally a siccative or a siccative oil is preferably used to hasten the drying.

As an example, we may take 50 gr. cod liver oil, 45 gr. pinolin and 5 gr. resinate of manganese, and heat the same in a wide flat vessel in the open air by means of a suitable heating device, until the temperature is raised to about 275° C. This resinate of manganese is composed of 100 parts of colophony, 10 parts of caustic soda (NaOH), and 35 parts of crystallized sodium carbonate ($Na_2CO_3$), $10H_2O$, which constituents are boiled in a kettle with 1,000 parts of water until the colophony has been dissolved. To the solution of resin-soap thus obtained a solution of sulfate of manganese ($MnSO_4$) is added in a sufficient quantity to decompose all the resin-soap. The precipitate thus formed consists of the resinate of manganese employed. Instead of colophony, of course, other resins may be used. The pinolin employed is also called spirit of resin, and is a product of the dry distillation of colophony. The latter is heated in a still provided with a cooling means and a receptacle, in order that the products may not be over heated. During the process the first runnings consist of an acid aqueous liquid up to about 130 degrees C., then comes pinolin from 130 degrees to 200 degrees C., after which come resin oils from 200 degrees C. upward. In the present process, the substances passing over between 150 degrees C. to 170 degrees C. are preferably employed. This pinolin is, therefore, a mixture of resin distillates boiling at about 150° C.; and, after the mass is sufficiently heated it is left to cool down and this process is repeated several times, if necessary, until the cooked product has assumed a honey-like, strong, liquid consistency.

The product when ready to spread may be applied at 150° C. in an equally thin layer upon the previously heated article, for example, copper wire; or the article to be insulated may be plunged into the cooking-product and at once brought into an air bath at 450° C. in which it may remain as long as the oil layer curdles and after a little cooling does not feel adhesive to the touch.

This insulating film possesses a very high elasticity, endures temperatures up to 600° C., and above, without losing its transparency; is not soluble in strong acids, in strong corroding and caustic alkalies, nor in any of the carbureted hydrogens, including pyridin. The new film has high fire and weather proof qualities, is an excellent insulator, is not fusible, and cannot be easily scratched.

This insulating material is preferably used in the protection of electric connecting wires and cables; and for covering metals in general with a protecting film when an insulator for heat and cold is desired. It may also be used for rendering water pipes water proof.

What I claim is:

1. The herein described process of producing insulating compounds, which consists in heating with a suitable siccative a mixture of animal fat and a resinous compound until a transparent and insulating material is produced; substantially as described.

2. The process of producing an insulating covering which consists in heating with a drying agent a mixture consisting of animal fats and a resinous compound; in heating the articles to be coated, and then suitably applying said mixture to said articles; substantially as described.

3. The process of producing an insulating covering for metallic objects which consists in heating to substantially 275° C. a mixture of animal fats, resinous distillates, and a drying agent; and in then applying said mixture at a suitable temperature in a thin layer to said objects; substantially as described.

In testimony whereof, I have signed my name to this specification in the presence of two subscribing witnesses.

KASPAR WINKLER.

Witnesses:
  JOSEPH SIMS,
  HERMANN HUBER.